US009675052B2

(12) United States Patent
Gingerich

(10) Patent No.: US 9,675,052 B2
(45) Date of Patent: Jun. 13, 2017

(54) POULTRY MIGRATION FENCE SYSTEM

(71) Applicant: Paul J. Gingerich, Hickory, KY (US)

(72) Inventor: Paul J. Gingerich, Hickory, KY (US)

( * ) Notice: Subject to any disclaimer, the term of this patent is extended or adjusted under 35 U.S.C. 154(b) by 392 days.

(21) Appl. No.: 14/447,453

(22) Filed: Jul. 30, 2014

(65) Prior Publication Data
US 2014/0331939 A1    Nov. 13, 2014

Related U.S. Application Data

(63) Continuation-in-part of application No. 13/769,244, filed on Feb. 15, 2013, now Pat. No. 9,119,381.

(51) Int. Cl.
*A01K 31/22* (2006.01)
*A01K 1/00* (2006.01)

(52) U.S. Cl.
CPC ............ *A01K 31/22* (2013.01); *A01K 1/0005* (2013.01)

(58) Field of Classification Search
CPC ...... E04B 2/7405; E01F 13/022; E01F 9/688; E01F 9/70
See application file for complete search history.

(56) References Cited

U.S. PATENT DOCUMENTS

| 3,017,860 | A | | 1/1962 | Wilson | |
|---|---|---|---|---|---|
| 3,135,235 | A | * | 6/1964 | Romano | E01F 9/688 |
| | | | | | 116/63 P |
| 3,593,681 | A | * | 7/1971 | Sernovitz | B60Q 7/005 |
| | | | | | 116/63 P |
| 3,651,851 | A | | 3/1972 | Curtis | |
| 3,924,344 | A | * | 12/1975 | Davis | G09F 7/08 |
| | | | | | 40/592 |
| 4,200,254 | A | * | 4/1980 | Nelson | E04B 2/7405 |
| | | | | | 160/351 |
| 4,368,586 | A | * | 1/1983 | Forzelias | G09F 7/002 |
| | | | | | 188/67 |
| 5,564,367 | A | | 10/1996 | Boyanton | |
| 5,771,954 | A | * | 6/1998 | Benner | E04B 2/7429 |
| | | | | | 160/135 |
| 6,289,848 | B1 | | 9/2001 | Estevez et al. | |
| 7,958,850 | B2 | | 6/2011 | Tsubai | |

OTHER PUBLICATIONS

"Migration Fence", http://www.hogslat.ro/Global/Catalogs/NorthCarolina/HTML/files/assets/basic-html/page194.html, last modified Jul. 6, 2012.

* cited by examiner

*Primary Examiner* — Daniel Wiley
(74) *Attorney, Agent, or Firm* — Richard C. Litman

(57) ABSTRACT

The poultry migration fence system includes at least one fence panel attached to at least one side of a U-shaped open archway. At least one selectively pivotal support rail is mounted to the bottom of the fence panel. The archway allows the fence system to be easily installed by sliding the open end of the archway over a suspended feed/water pipe. The pivotal support rail can be pivoted to a support position where the support rail extends orthogonal to the fence panel in order to provide a stable base for maintaining the upright position of the fence panel and pivoted to a storage position parallel to the extension of the fence panel. A swiveling gate is pivotally attached to one of the legs of the archway so that the gap at the open end can be selectively closed, thereby preventing poultry from crossing towards the other side of the fence panel. Both solid and wire fence panels are provided.

15 Claims, 16 Drawing Sheets

POULTRY MIGRATION FENCE SYSTEM

CROSS-REFERENCE TO RELATED APPLICATIONS

This is a continuation-in-part of my prior application Ser. No. 13/769,244, filed Feb. 15, 2013, currently pending.

FIELD OF THE INVENTION

The present invention relates to animal husbandry and particularly to a poultry migration fence system that provides easy, convenient installation and effective segregation of poultry for the benefit of the overall health and growth of poultry.

DESCRIPTION OF THE RELATED ART

Many poultry farmers are in charge of raising hundreds, if not thousands, of poultry, such as chickens and turkeys, per year. In order to successfully raise poultry, they cannot be allowed to congregate in one area for extended periods of time, since that can lead to overcrowding. Overcrowding creates many health and psychological issues for the birds. For example, the normal circadian rhythms will be difficult to synchronize due to intermittent disturbances from one or more segments of the population while the others are trying to rest. Inadequate rest can lead to immunosuppression and increased susceptibility to diseases. Sanitary conditions also become compromised because the bodily wastes are pooled in the congregated area. Exposure to such concentrated wastes increases the risk of diseases and infections. Most chicken houses have plenty of room to accommodate all the poultry being raised, and it should be fully utilized for proper air circulation and a healthy environment for their physical growth.

In light of the above, it would be a benefit in the art of animal husbandry to provide a fence system that can be easily installed to segregate the poultry and conveniently stored when not in use. Thus, a poultry migration fence system solving the aforementioned problems is desired.

SUMMARY OF THE INVENTION

The poultry migration fence system includes at least one fence panel attached to at least one side of a U-shaped open archway. At least one selectively pivotal support rail is mounted to the bottom of the fence panel. The archway allows the fence system to be easily installed by sliding the open end of the archway over a suspended feed/water pipe. The pivotal support rail can be pivoted to a support position where the support rail extends orthogonal to the fence panel in order to provide a stable base for maintaining the upright position of the fence panel and pivoted to a storage position parallel to the extension of the fence panel. A swiveling gate is pivotally attached to one of the legs of the archway so that the gap at the open end can be selectively closed, thereby preventing poultry from crossing towards the other side of the fence panel. Both solid and wire fence panels are provided.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
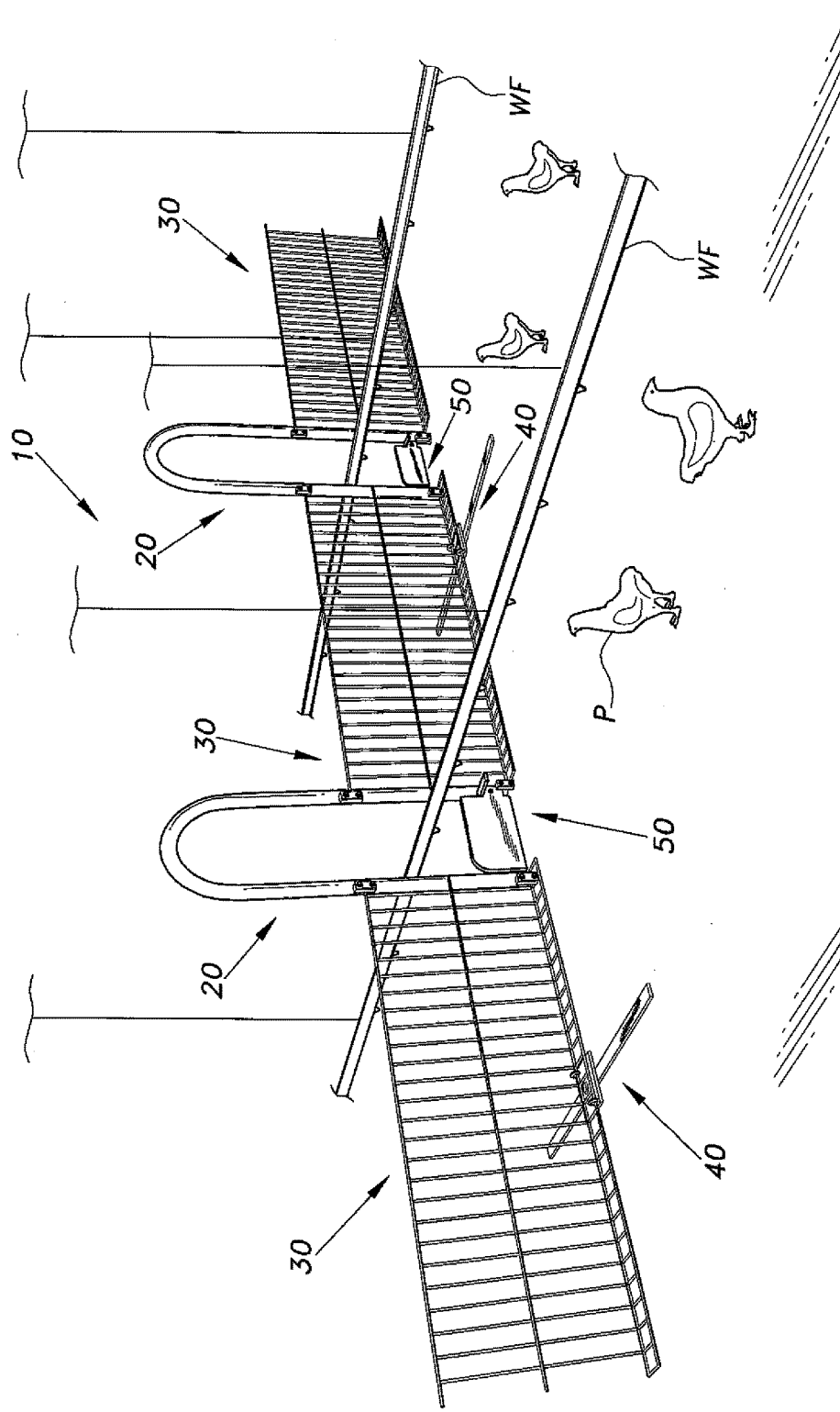
FIG. 1 is an environmental, perspective view of a poultry migration fence system according to the present invention.

The poultry migration fence system, generally referred to by the reference number 10 in the drawings, provides a convenient and easy-to-install fence assembly that prevents undesirable migration of poultry in a poultry farm and maximizes use of available space. Moreover, the poultry migration fence system 10 is constructed so that minimal storage space is required for storage.

Figure 2:
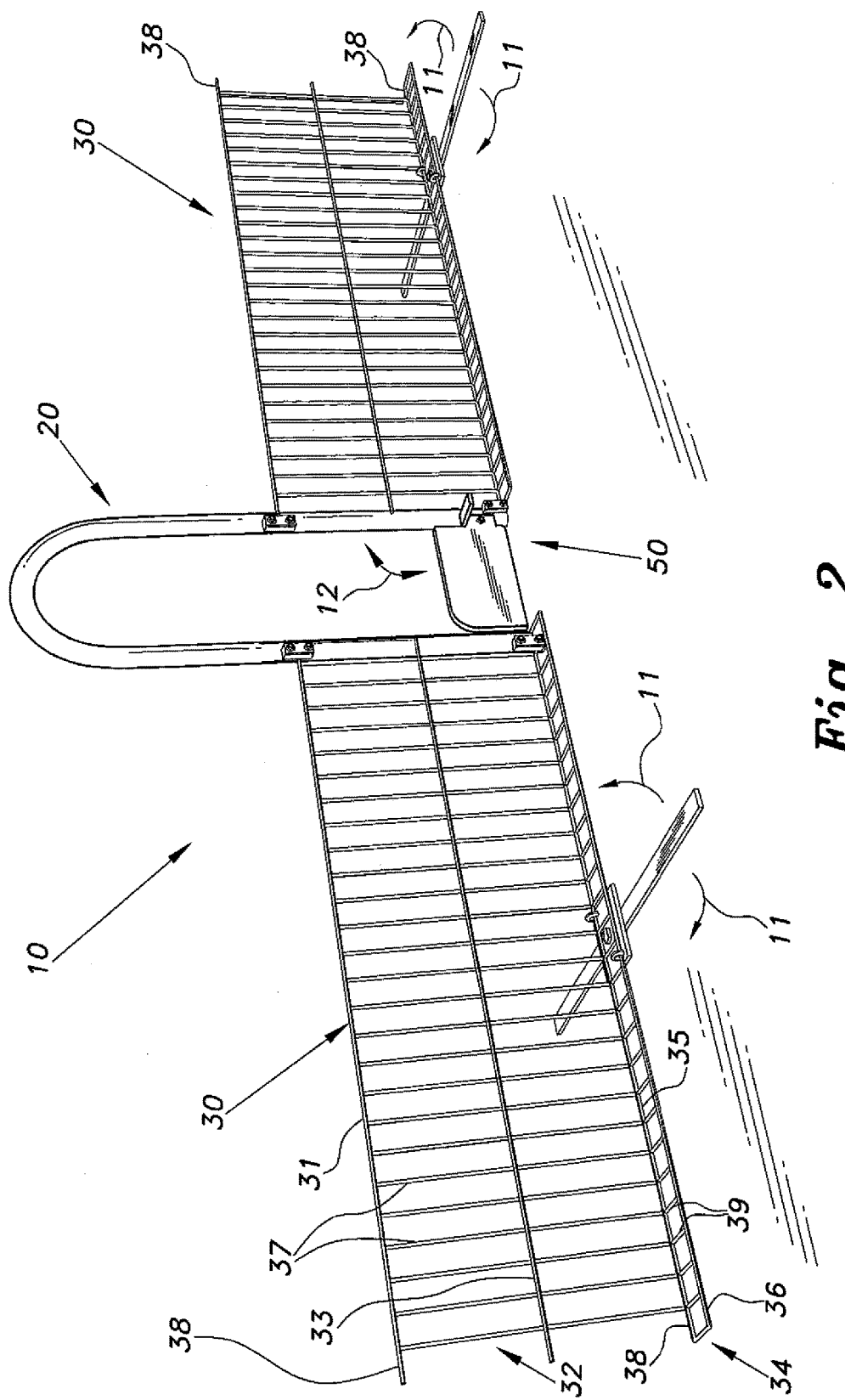
FIG. 2 is a perspective view of the poultry migration fence system of FIG. 1.

As shown in FIGS. 1 and 2, the poultry migration fence system 10 includes at least one elongate, U-shaped archway 20 and at least one fence panel 30 attached to one or both legs 22 of the archway 20. This construction forms a barrier between select sections of the housing for the poultry P, thereby preventing migration of the poultry P between sections.

The archway 20 includes a curved top section and depending legs 22 forming a gap or open section between the legs 22. During installation, the gap allows the user to easily slide the poultry migration fence system 10 over existing, suspended water/feed pipes WF, the pipes WF extending between the legs 22. This process greatly relieves physical stress on the user, compared to conventional fence systems, because bending and kneeling is kept to a minimum. The archway 20 spans respective water/feed pipes WF and allows passage thereof through the poultry migration fence system 10.

The fence panel 30 is an elongate, substantially L-shaped wire fence having an upright, main section 32 and a lower minor section 34 extending perpendicular to the main section 32. Preferably, both the main and minor sections 32, 34 are rectangular or square in shape. Other geometric shapes and patterns, such as circles, ovals, diamonds, polygons and the like, can be used, so long as they provide an effective barrier preventing the poultry P from migrating from one side to another.

Figure 4:
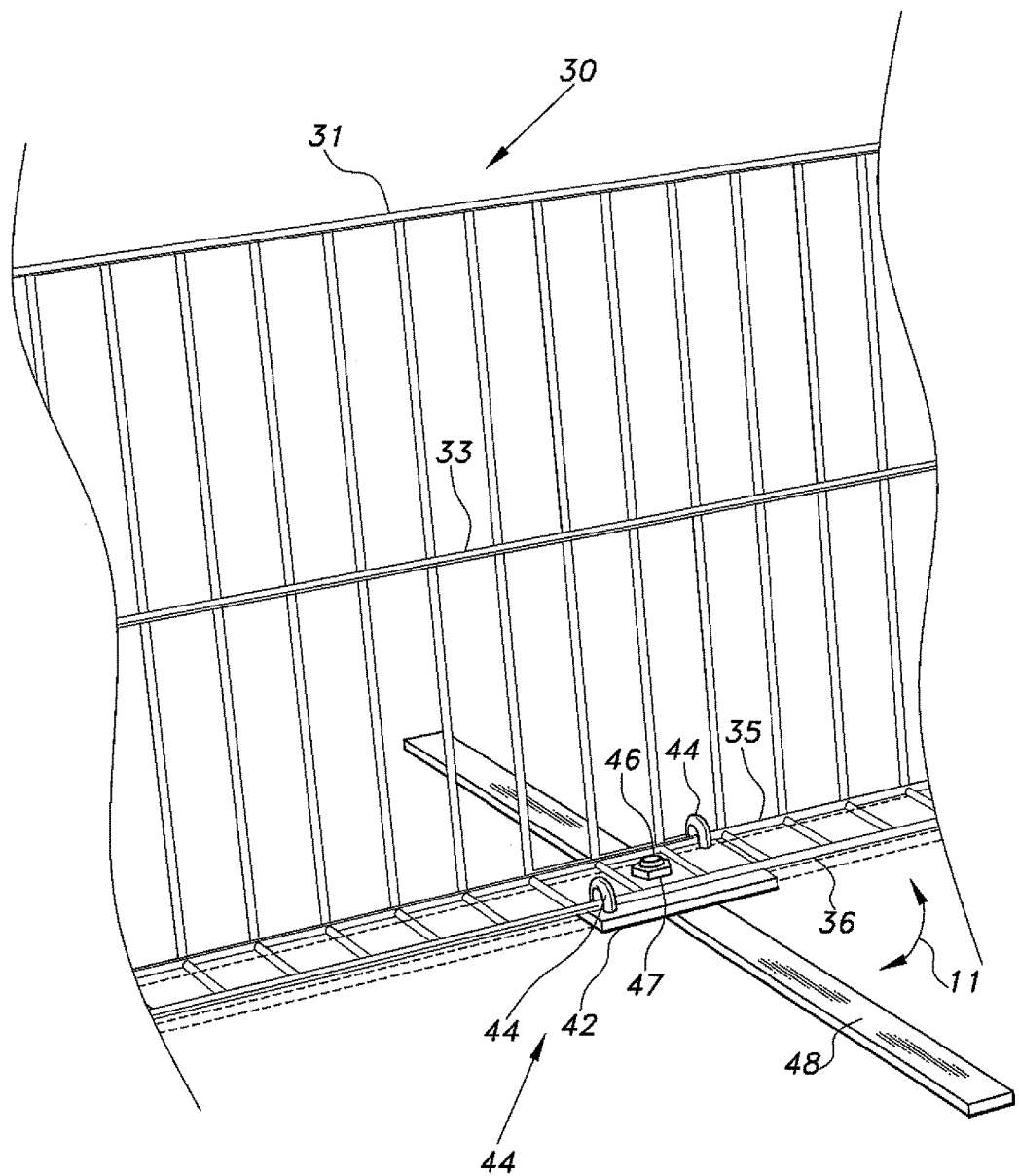
FIG. 4 is a partial perspective view of the pivotal support rail in the poultry migration fence system of FIG. 1.

As best seen in FIGS. 2 and 4, each wire fence includes a top cross member or wire 31, at least one central cross member or wire 33, a bottom cross member or wire 35, an outer cross member or wire 36, a plurality of spaced vertical members or wires 37 extending between the top and bottom cross members 31, 35, and a plurality of lateral spacer members or wires 39. The cross members 31, 33, 35, 36 provide horizontal structural support for the fence panel 30, while the vertical members 37 and the lateral members 39 provide vertical support for the main section 32 and the minor section 34 respectively. The bottom cross member 35 forms a junction between the major and minor sections 32, 34. It is noted that the wire fence can include any number of cross, vertical and lateral members.

Figure 3:
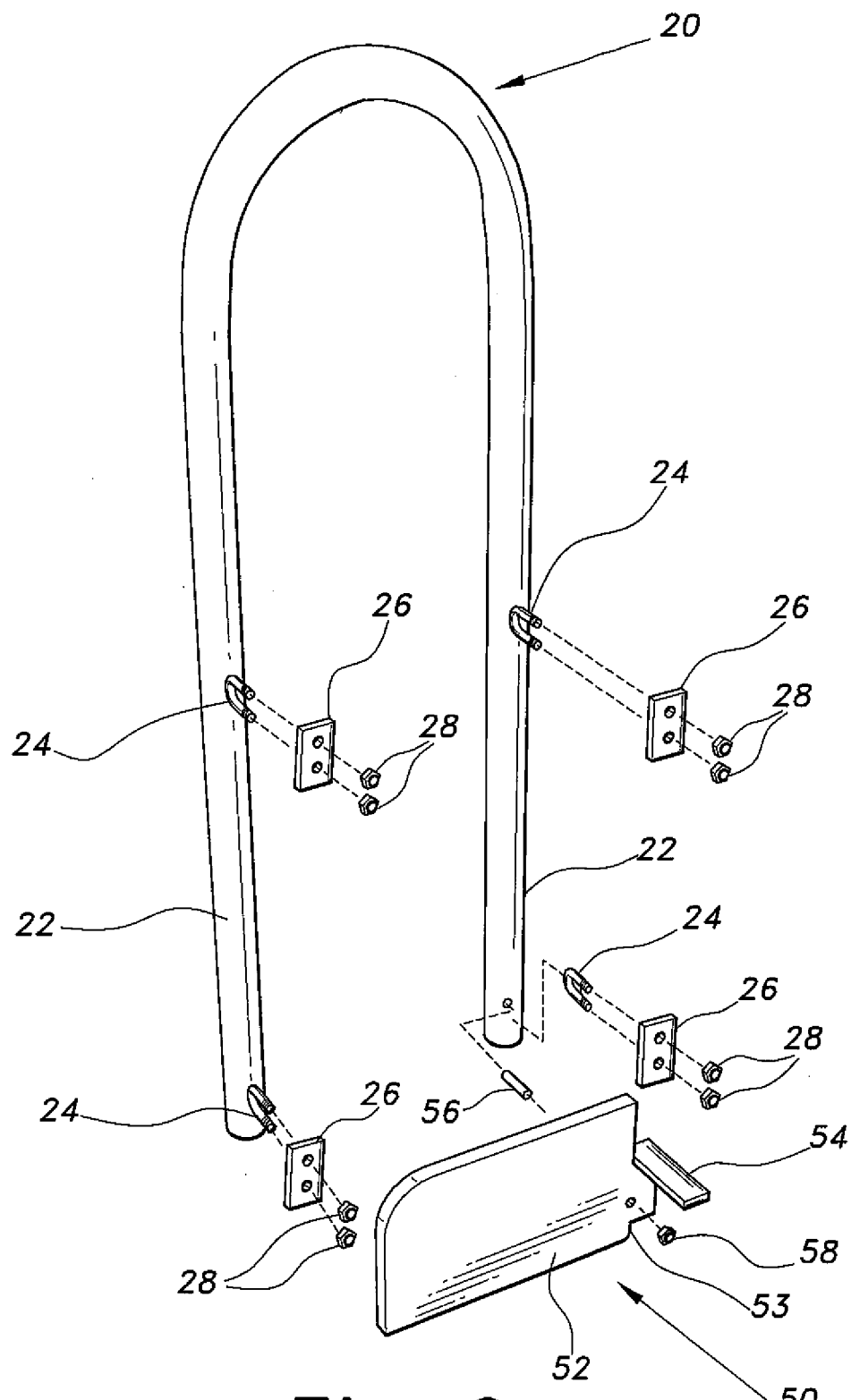
FIG. 3 is an exploded view of the archway and gate in the poultry migration fence system of FIG. 1.

To attach the fence panel to the archway 20, each wire fence includes at least top and bottom extensions 38 extending from the top cross member 31 and the bottom cross member 35 on opposite sides of the main section 32. As shown in FIGS. 2 and 3, the archway 20 includes a plurality of U-bolts 24 rigidly attached to the legs 22, including a spaced pair of U-bolts 24 attach to each leg 22, each U-bolt 24 having threaded ends. The U-bolts 24 can be integrally formed on the legs 22, welded, or adhesively attached to the legs 22. A respective extension 38 of the fence panel 30 is inserted between the legs of the U-bolt 24 and clamped therein by a clamping plate 25 and fasteners or nuts 28. As an alternative to U-bolts 24, a pair of spaced apart threaded studs may extend from each leg 22. Moreover, the extensions 38 can be clamped between the spaced bolts by quick-release clamps.

The fence panel 30 alone may not be able to maintain an upright position for extended periods during use. The extension of the minor section 34 from the main section 32 does not provide sufficient area of support to prevent the fence panel 30 from toppling over, especially since the minor section 34 extends from only one side. In order to provide a more stable base support for the fence panel 30, the poultry migration fence system 10 includes a fence panel support assembly 40 detachably mounted to the minor section 34. As shown in FIGS. 1, 2 and 4, the fence panel support assembly 40 includes a support plate 42 attached below the minor section 34. At least a pair of U-bolts 44 are hooked over the bottom cross member 35 and the outer cross member 36, respectively, and inserted through diagonal corners of the support plate 42. The U-bolts 44 are fastened to the plate 42 via nuts (not shown). Although only two corners of the support plate 42 are shown connected by the U-bolts 44, any number of the corners can be used to attach the support plate 42 to the fence panel 30. An elongate support bar 48 is rotatably mounted to the support plate 42 through a central pivot bolt 46 and nut 47. With this construction, the support rail 48 can be pivoted or rotated from a stowed position (shown in phantom in FIG. 4) to a support position (shown in solid lines) and vice versa, as indicated by the arrow 11.

As can be seen from FIG. 4, the support rail 48 in the support position preferably extends orthogonally from both sides of the plane of the main section 32. This is a very stable configuration that will maintain the upright position of the fence panel 30, even through repeated jostling from poultry P. The stowed or storage position places the support rail 38 into an inconspicuous and non-protruding configuration so that the poultry migration fence assembly 10 can be easily stored by hanging against a wall or stacking with minimal impact on storage space. More than one fence panel support assembly 40 can be mounted to each fence panel 30.

Figure 5:
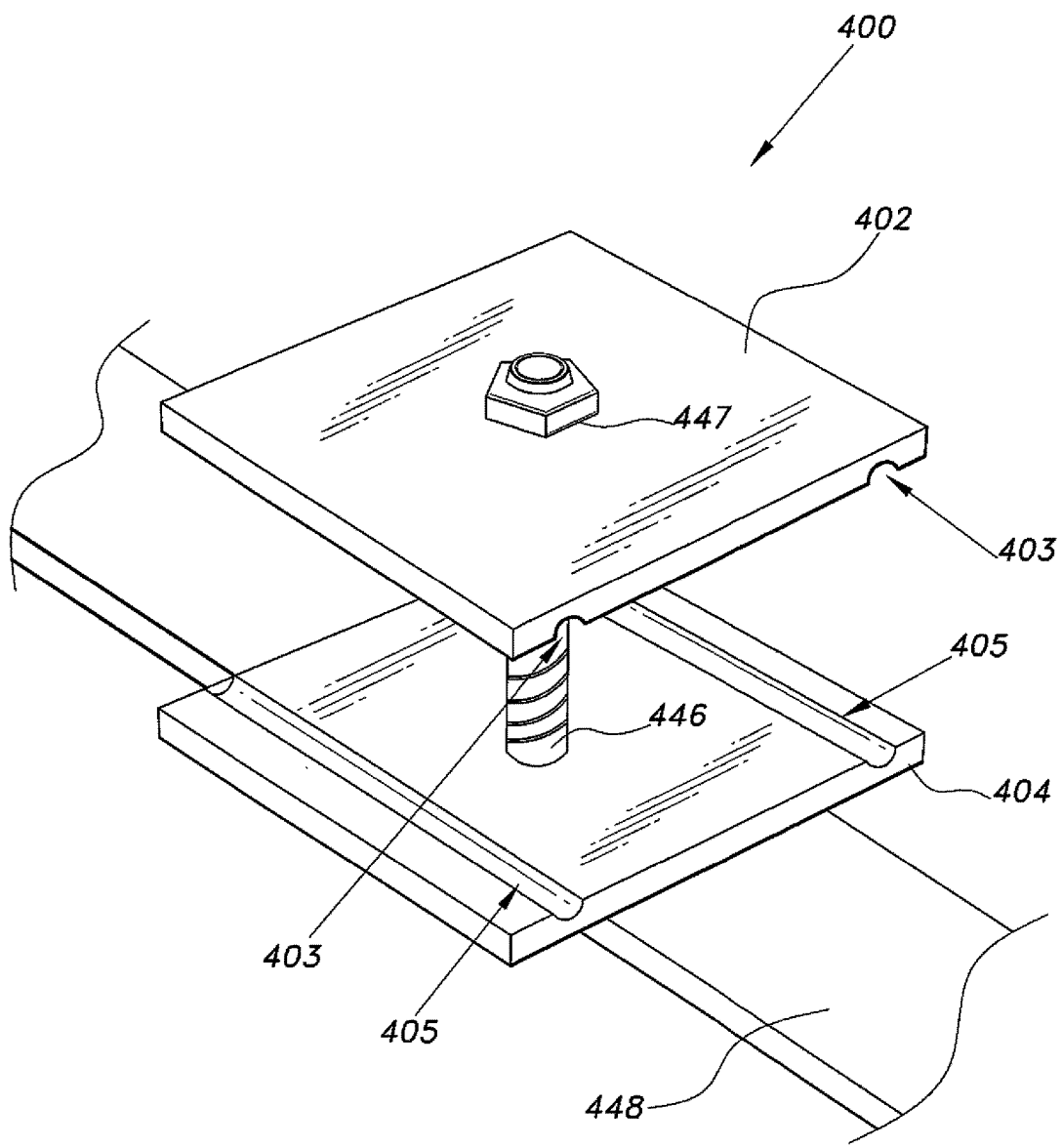
FIG. 5 is an alternative embodiment of a mounting bracket for the pivotal support rail of FIG. 4.

An alternative embodiment of a fence panel support assembly 400 is shown in FIG. 5. In this embodiment, the support for the pivotal support rail 448 is a clamping assembly. As shown, the fence panel support assembly 400 includes an upper clamping plate 402 and a lower clamping plate 404. The upper clamping plate 402 includes a pair of spaced, upper grooves 403 facing downward, while the lower clamping plate 404 includes a pair of spaced, lower grooves 405 facing upward in line with the upper grooves 403. In use, the lower clamping plate 404 is placed underneath the minor section 34 with the lower grooves 405 straddling adjacent lateral members 39 from the bottom. The upper clamping plate 402 is placed atop the minor section 34 over the lower clamping plate 404 so that the upper grooves 403 straddle the same adjacent lateral members 39 from the top. The support rail 448 is pivotally mounted to the upper and lower clamping plates 402, 404 via a bolt 446 and fastener or nut 447. Selective tightening of the nut 447 clamps the clamping plates 402, 404 together, sandwiching the adjacent lateral members 39 between the upper and lower grooves 403, 405. The upper and lower grooves 403, 405 insure that clamping plates 402, 404 are securely mounted to the minor section 34 with minimal unwanted movement. In all other respects, the fence panel support assembly 400 functions substantially the same as the previously mentioned fence panel support assembly 40. As a further alternative, the upper clamping plate 402 and the lower clamping plate 404 can include extending flanges that hook over adjacent lateral members 39 for similar secure engagement with the minor section 34.

Once installed, the gap between the legs 22 in the archway 20 can pose a problem with poultry P attempting to migrate to the other side through said gap. In order to prevent such an occurrence, the poultry migration fence system 10 includes a gate assembly 50 attached to one of the legs 22. As shown in FIGS. 1-3, the gate assembly 50 includes a gate 52 pivotally mounted to one of the legs 22. The gate 52 can be constructed as a substantially rectangular plate having a throughbore near a corner of one side of the plate. The throughbore allows the gate 52 to slide over a bolt 56 disposed on the leg 22. The gate 52 is secured thereto via a fastener or nut 58. The bolt 56 can be permanently affixed to the leg 22, or can be a discrete bolt threaded at both ends for mounting the bolt 56 onto the leg 22. The bolt 56 is preferably disposed above the lower U-bolt 24, and the gate 52 can include a cutout section 53 as clearance for the U-bolt 24 and associated clamping plate 26. The gate 52 is provided with an outwardly extending finger tab or handle 54 for the user to easily and selectively swivel the gate 52 upward to an open position and downward to a closed position crossing the legs of the archway 20, as indicated by the arrow 12 in FIG. 2.

Figure 6A:
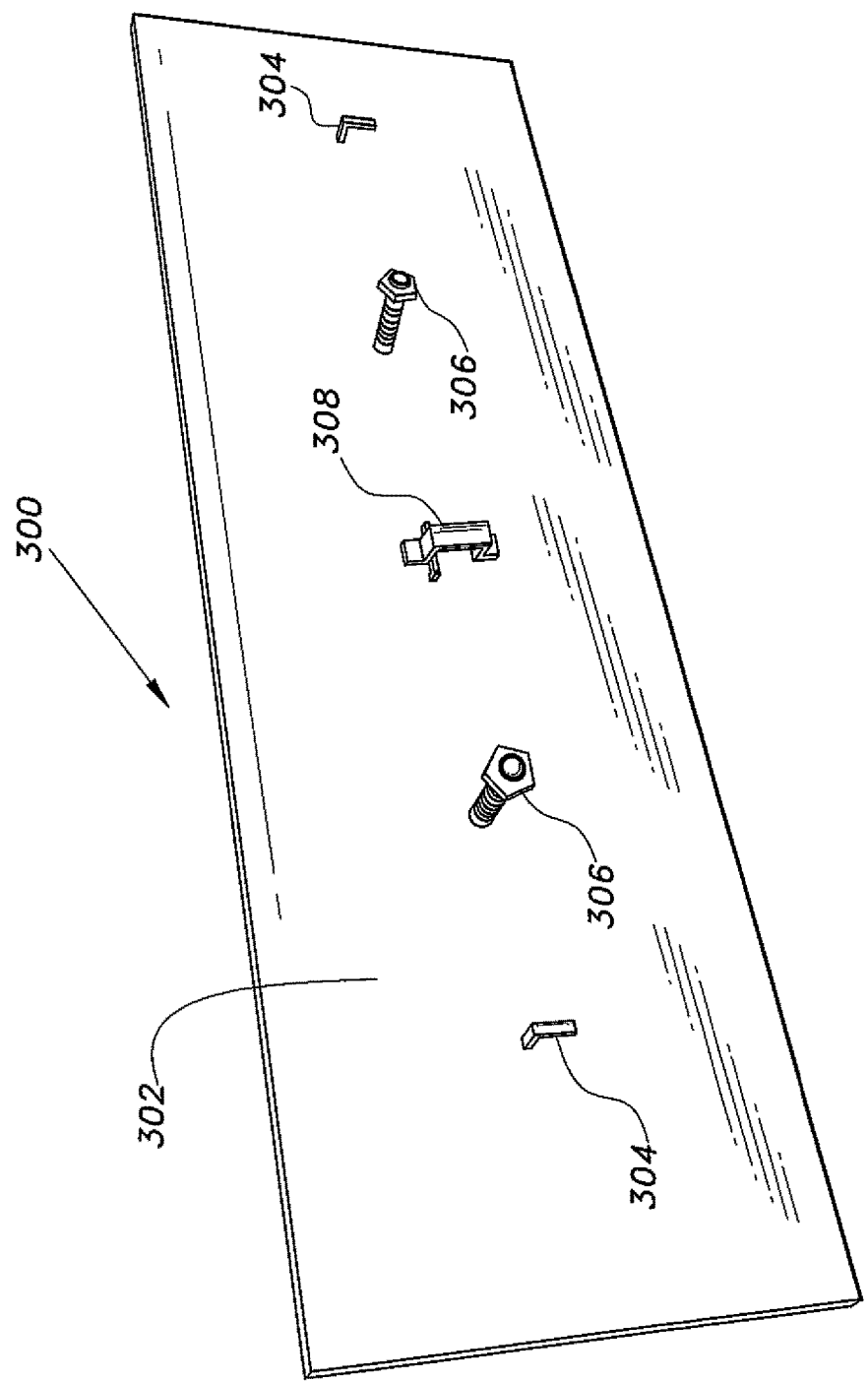
FIG. 6A is a perspective view of a solid fence panel accessory for a poultry migration fence system according to the present invention.
Figure 6B:
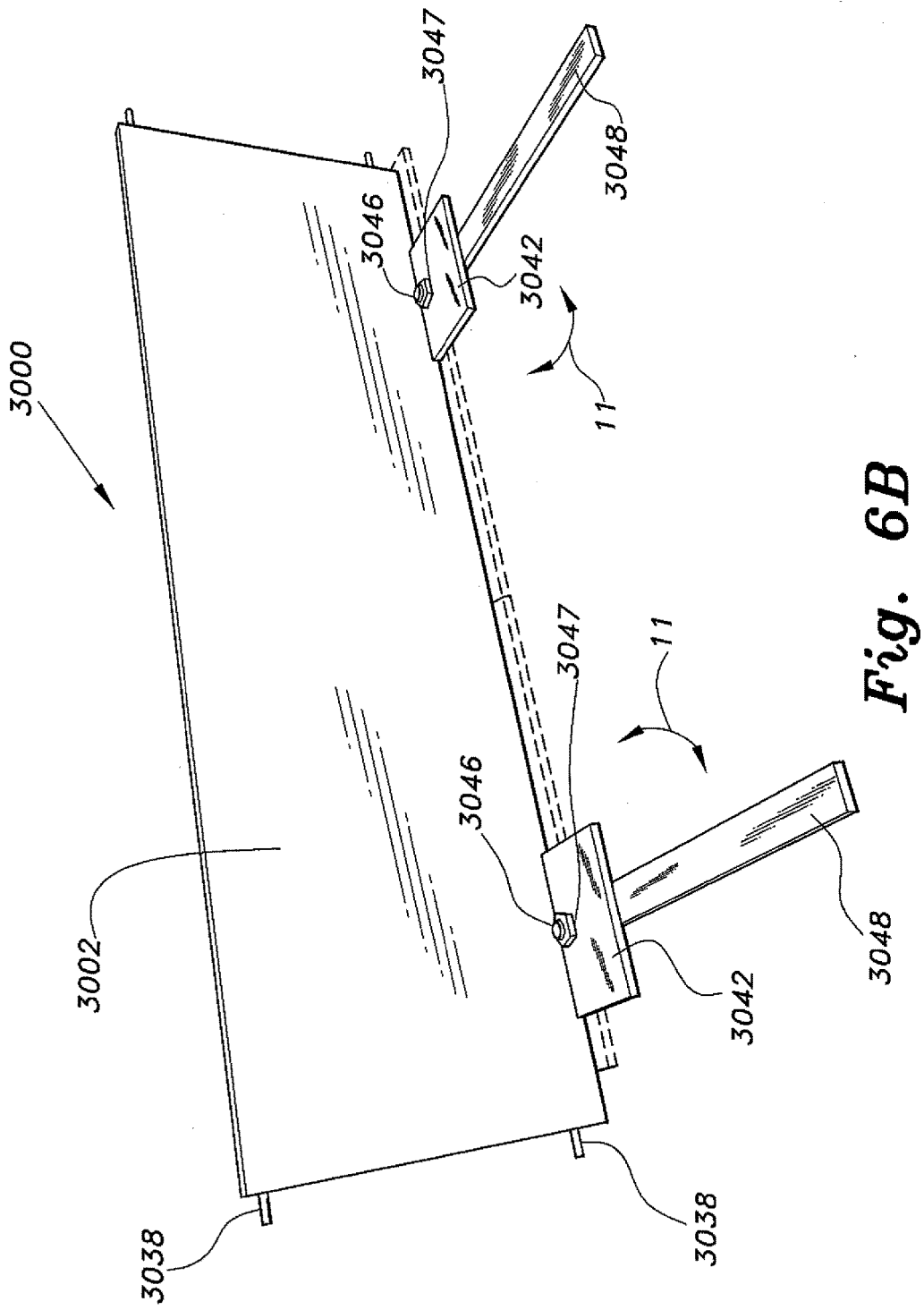
FIG. 6B is a perspective view of an alternative embodiment of a solid fence panel for a poultry migration fence system according to the present invention.

FIGS. 6A and 6B shows alternative fence panels for the poultry migration fence system 10. FIG. 6A shows an accessory in the form of a solid fence panel 302 that can be attached to the wire fence. The solid fence panel 302 is preferably square or rectangular in shape, conforming to the shape of the main section 32. The solid fence panel 302 can be constructed from wood, lightweight steel, plastic, composites and/or combinations thereof. The solid fence panel 302 includes various means for mounting the solid fence panel 302 on the wire fence panel 30, such as hooks 304, bolts 306 and/or a latching mechanism 308. The solid fence panel 302 can be provided with one or a combination of the above means, which are preferably configured for attaching onto the center cross member 33.

FIG. 6B shows a stand-alone solid fence panel 3000. The fence panel 3000 includes a solid fence 3002 constructed from similar materials and shape as the fence panel 300. The opposing sides of the solid fence 3002 include a pair of mounting extensions 3038 to facilitate mounting of the solid fence 3002 onto the archway 20. A pair of support brackets 3042 are disposed at the bottom of the solid fence 3002. A support rail 3048 is pivotally mounted to each support bracket 3042 via a bolt 3046 and fastener 3047. As can be seen from FIG. 6B, the solid fence panel 3000 can replace the wire fence panel 30 and provide the same stability and storage options.

As an alternative to the above, the poultry migration fence system 10 can be provided in a kit that includes the archway 20, the fence panel support assembly 40, 400, the gate assembly 50 and associated mounting hardware for use with conventional wire fences. This allows poultry farmers to assemble fences with the ease of installation, stability and storage mentioned above, and with minimal modifications to existing fences. Moreover, the kit can include the solid fence panels 30 and/or 3000.

Figure 7:
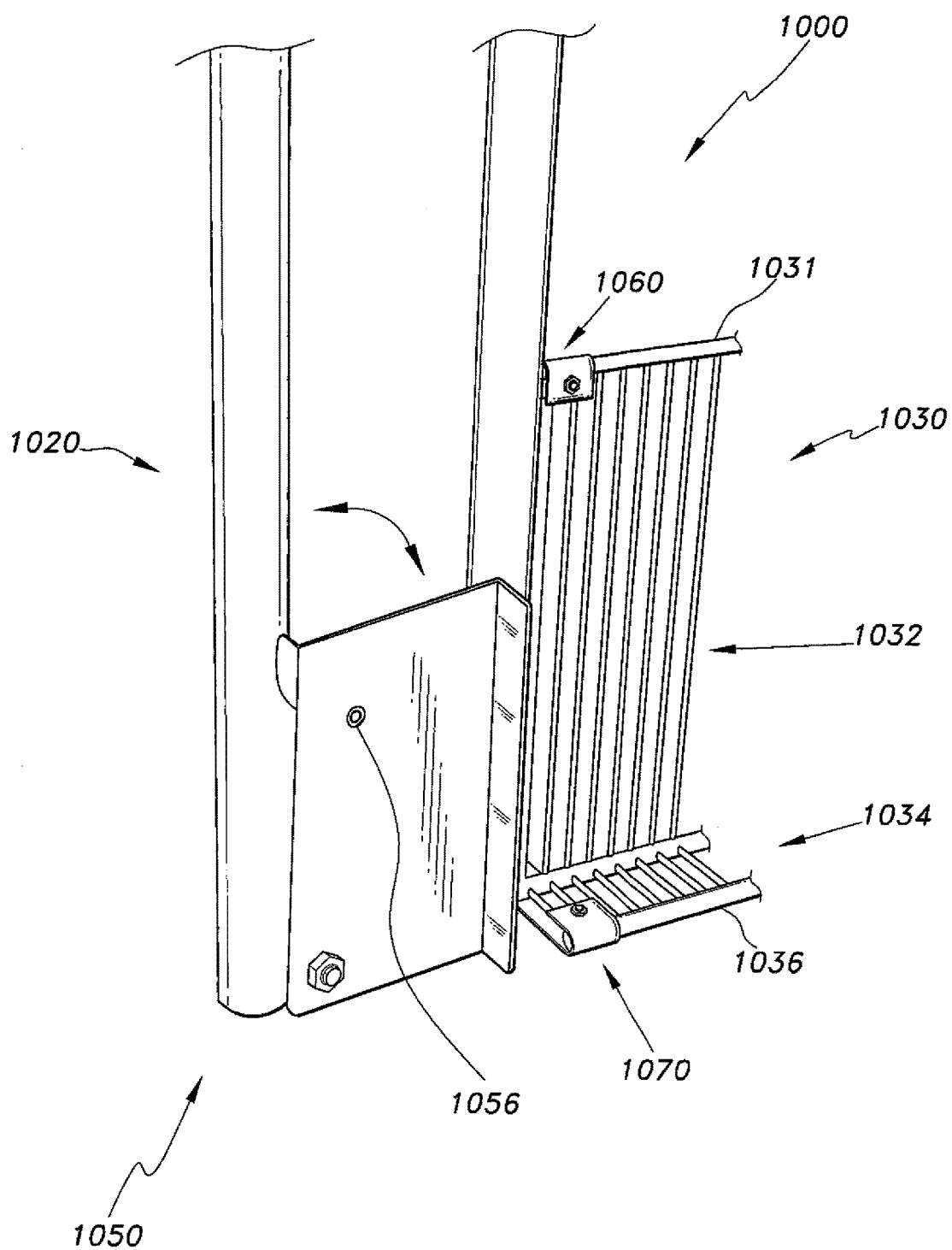
FIG. 7 is a partial perspective view of a further alternative embodiment of a poultry migration fence system according to the present invention, the system particularly including an alternative embodiment of a gate.
Figure 8:
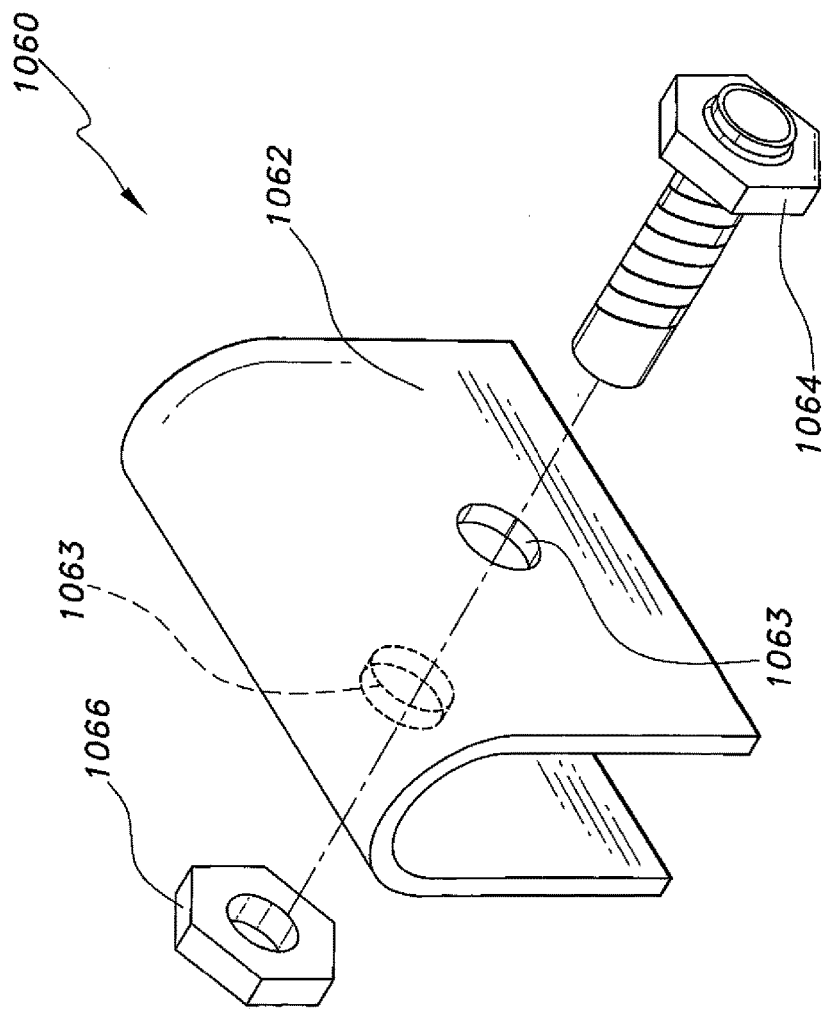
FIG. 8 is an exploded view of an alternative bracket for the fence panel of FIG. 7.
Figure 9:
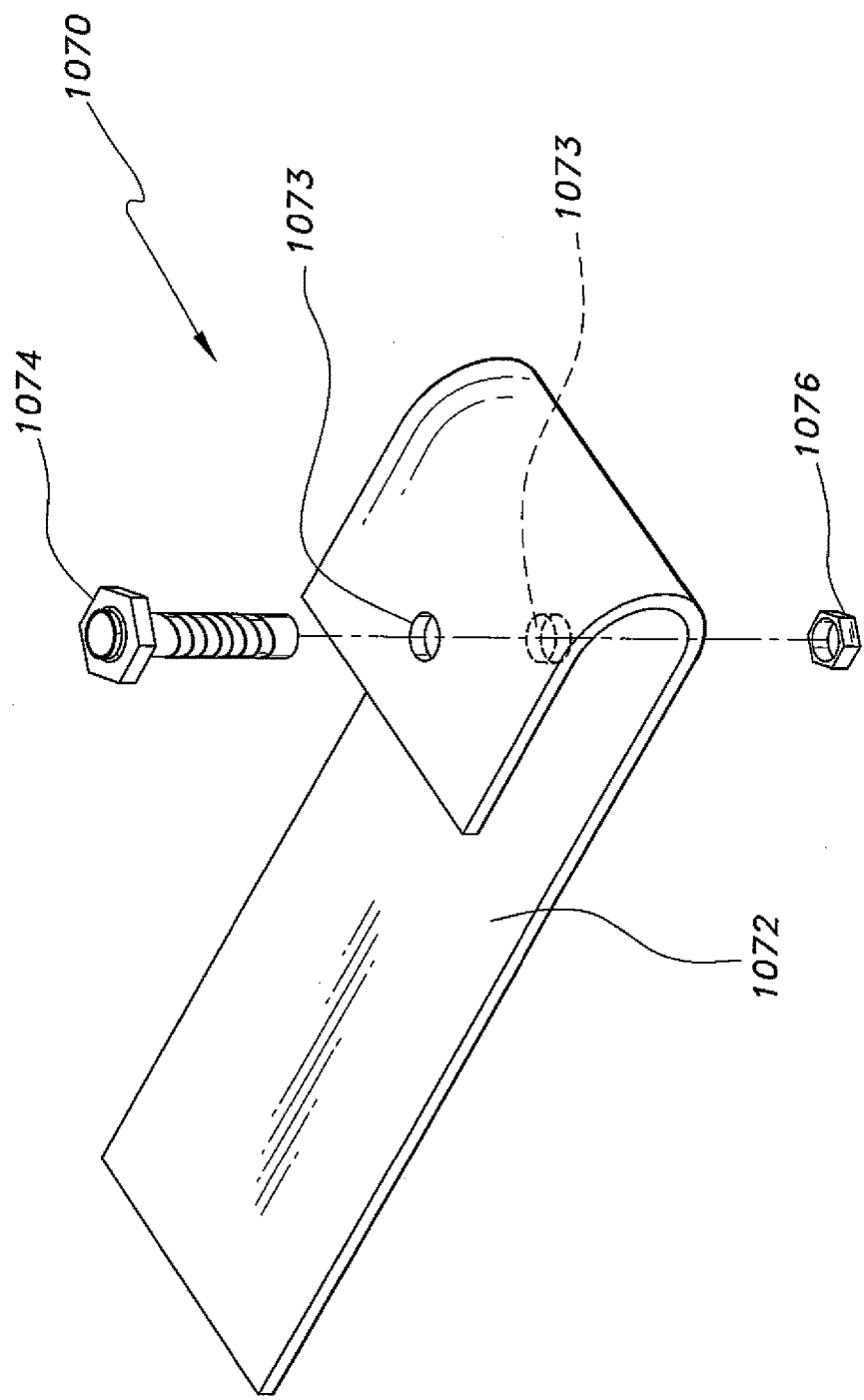
FIG. 9 is an exploded view of another alternative bracket for the fence panel of FIG. 7.

A still further alternative poultry migration fence system 1000 is shown in FIG. 7. This embodiment features an alternative gate assembly and alternative means for attaching a fence panel 1030. As shown in FIGS. 7-9, the poultry migration fence system 1000 includes an upper bracket 1060 and a lower bracket 1070 that facilitate easier and rapid installation of the fence panel 1030.

The upper bracket 1060 is rigidly attached to one of the legs of the archway 1020, e.g., a lateral edge of the bracket 1060 is welded to the archway leg. The upper bracket 1060 can be placed at any required or desired height either by adjustable mounting or by fixed means in order to accommodate the height of the fence panel 1030. The upper bracket 1060 includes an inverted U-shaped bracket plate 1062 configured to mainly receive the top cross member 1031 on the main section 1032 of the fence panel 1030. In this embodiment, the bracket plate 1062 is bent into a U-shape, forming an opening that wraps around the top cross member 1031 to provide a clamping mechanism. The bracket plate 1062 includes aligned holes 1063 through which a fastener, such as a bolt 1064, can pass below the cross member 1031 and be secured by a nut 1066. When the upper bracket 1060 is mounted to the top of the main section 1032, this fastener 1064, 1066 can be tightened to clamp the received portion of the main section 1032 therein. As an alternative to the above, the bracket plate 1062 can be constructed as a separate member that can be detachably mounted to the archway 1020 via separate fasteners, and additional fasteners, such as cam fasteners, can be used to clamp the bracket plate 1062 onto the main section 1032.

The lower bracket 1070 is also rigidly attached to one of the legs of the archway 1020, e.g., the bottom edge of the archway leg may be welded to a corner of the lower bracket 1070. The lower bracket 1070 includes an elongate bracket plate 1072 having a U-shaped end that is configured to mainly receive the outer cross member 1036 on the minor section 1034 of the fence panel 1030. In this embodiment, the bracket plate 1072 is J-shaped, where the hook forms an opening that wraps around the outer cross member 1036 for clamping. The bracket plate 1072 includes aligned holes 1073 through which a fastener, such as a bolt 1074, can pass and be secured by a nut 1076. When the lower bracket 1070 is mounted to the outer portion of the minor section 1034, this fastener can be tightened to clamp the received portion of the minor section 1034 therein. As an alternative to the above, the bracket plate 1072 can be constructed as a separate member that can be detachably mounted to the archway 1020 via separate fasteners, and additional fasteners, such as cam fasteners, can be used to clamp the bracket plate 1072 onto the minor section 1034. As a further alternative, the lower bracket 1070 can be constructed to adjustably accommodate various thicknesses of the minor section 1036, e.g., a flexible hook section, a separate plate for the hook section spanning at least a portion of the width of the minor section 1036 or the whole width, a pivotal hook section, and the like. It is noted that the above upper bracket 1060 and the lower bracket 1070 can be applied to any of the previously described embodiments.

Figure 10:
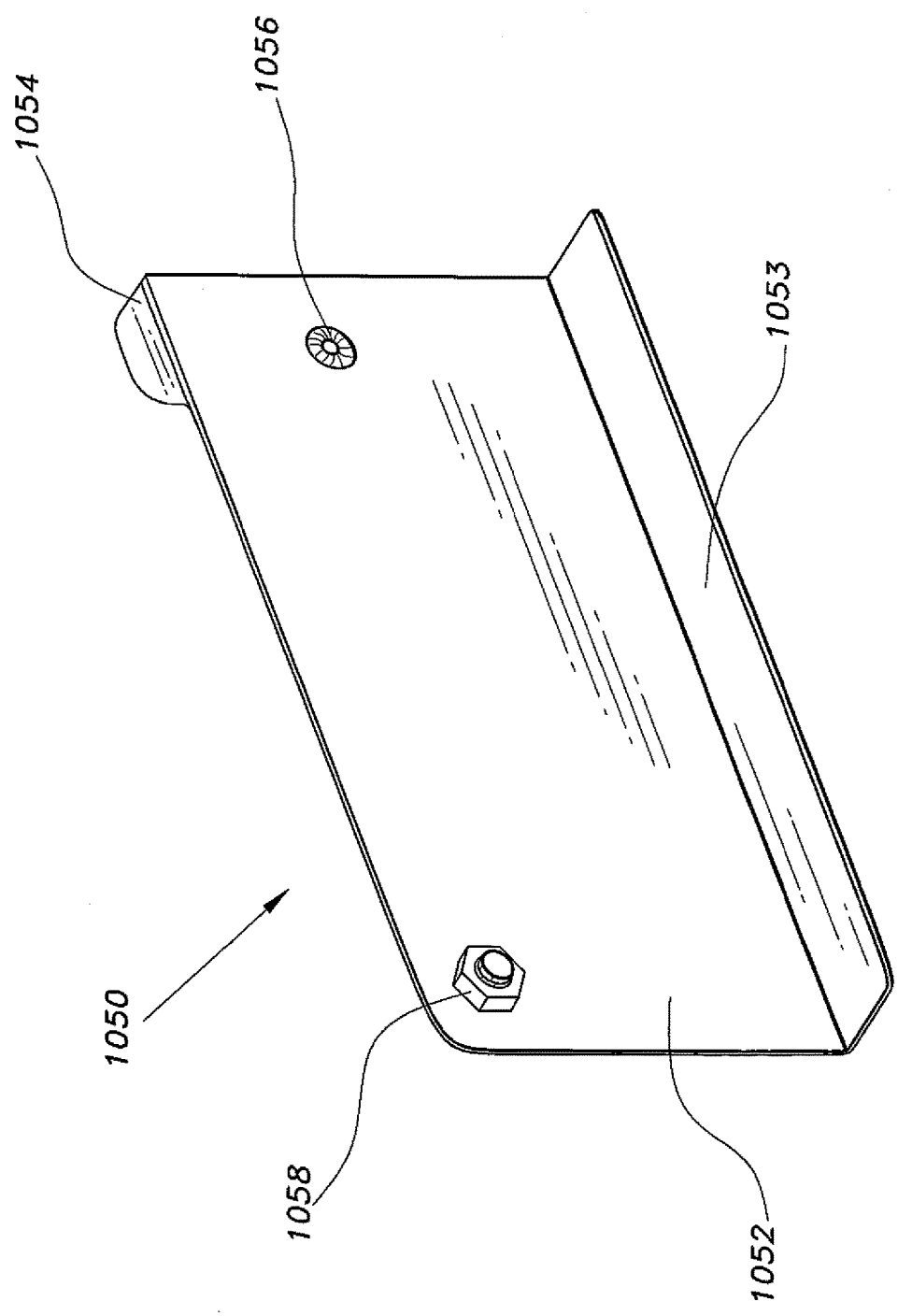
FIG. 10 is a perspective view of the alternative gate of the embodiment of the fence system of FIG. 7.

As shown in FIGS. 7 and 10, the alternative gate assembly 1050 includes an elongate, substantially rectangular gate panel having an upright, main section 1052 and an integral handle 1053 that extends orthogonal to the main section 1052. The gate panel is pivotally mounted to one of the legs of the archway via a fastener 1058. The main section 1052 serves as the barrier in the gap of the archway 1020. When pivoted to an upright position, the width of the main section 1052 spans substantially the whole length of the gap between the legs of the archway 1020. The handle 1053 is constructed as a side flange to be grasped by a user's hand. More preferably, the user can use one's foot to flip the gate panel into the closed position by placing the tip of the foot under the protruding flange and lifting quickly to pivot the gate panel. This process places less strain on the user's back and legs by eliminating the need to lower oneself towards the ground to perform the same function. The side flange construction also provides increased structural rigidity to the gate panel.

Additionally, the gate assembly 1050 includes a passive means of latching the gate panel. As shown, the main section 1052 includes a locking indention 1056 formed at a portion of the main section 1052 distal from the pivotal connection via fastener 1058 and a catch tab 1054 extending from the top edge of the main section 1052 in the opposite direction from the handle 1053. The locking indention 1056 forms a protrusion on the side distal from the pivot fastener 1058 so that when the gate assembly 1050 is pivoted into the closed, upright position, the leg upon which the main section 1052 rotates will be trapped between the protrusion and the catch tab 1054.

Figure 11:
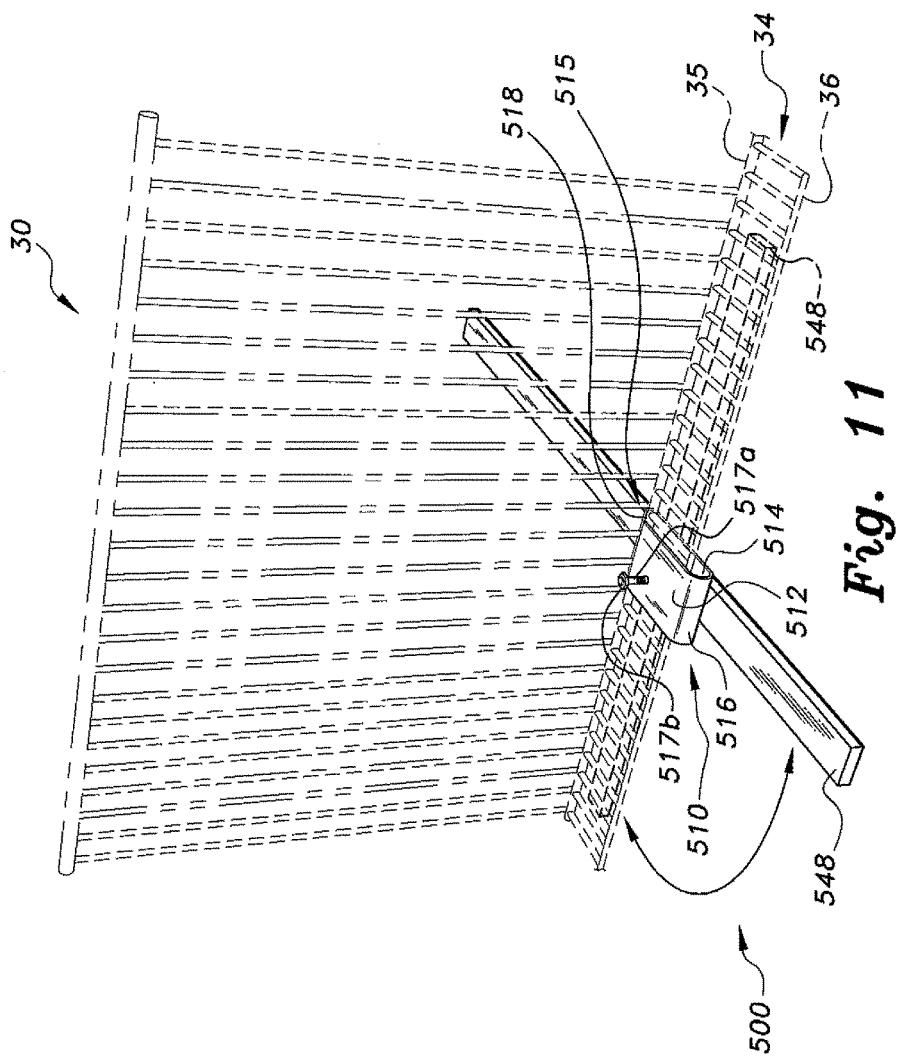
FIG. 11 is a perspective view of an embodiment of a fence panel support assembly for a poultry migration fence system according to the present invention.

FIG. 11 discloses another embodiment of a fence panel support assembly 500. This fence panel support assembly 500 is of relatively simpler construction from the previous embodiments facilitating easier and faster installation and removal of the fence panel support assembly 500. As shown, the fence panel support assembly 500 includes a mounting bracket 510 and an elongate support rail 548 pivotally coupled to the mounting bracket 510.

The mounting bracket 510 is desirably a substantially U-shaped member having an upper plate section 512 and a lower plate section 514 constructed to be mounted respectively above and below the minor section 34 of a wire fence or wire fence panel 30 in a horizontal orientation. The U-shape of the mounting bracket 510 provides an open end 515 and a closed end 516. The open end 515 allows the mounting bracket 510 to easily slide onto the minor section 34 from the outer cross member 36, and the closed end 516 surrounds the outer cross member 36 to securely seat the mounting bracket 510 onto the minor section 34. Alternatively, the mounting bracket 510 can slide into a desired position from a side or lateral end of the fence panel 30. The upper plate section 512 includes at least one through hole and the lower plate section 514 also includes a through hole substantially aligned with the through hole of the upper plate section 512. These through holes are desirably placed near the distal or open end of the mounting bracket 510 so that the natural resiliency of the upper and lower plate sections 512 and 514 can be utilized to maximal effect for clamping the mounting bracket 510 onto the minor section 34. The lower plate section 514 is an elongate section desirably longer in length than the upper plate section 512. The lower plate section 514 is also provided with an upright or upwardly extending lip 518 at a distal end thereof. The lip 518 serves as an abutment that cradles the bottom cross member 35 of the fence panel 30 when assembled. Thus, the lip 518 substantially prevents the mounting bracket 510 from inadvertently being pulled out of engagement with the minor section 34.

To clamp the mounting bracket 510 onto the lower section 34 of the wire fence panel 30, the mounting bracket 510 includes a clamping bolt 517a inserted through the through holes, and a clamping nut 517b is rotatably mounted to the threaded end of the clamping bolt 517a. In an embodiment, the clamping nut 517b is desirably disposed on the side of the upper plate section 512 for convenient access by the user. It is to be noted, however, that the disposition of the clamping bolt 517a and clamping nut 517b can be reversed, or they can be arranged in any desired manner and orientation. Moreover, any of the aforementioned fasteners can be used in place of the clamping bolt 517a and clamping bolt 517b. Selective tightening or loosening of the clamping nut 517b respectively clamps or releases the upper and lower plate sections 512, 514 together or apart from each other with portions of the fence panel 30 sandwiched therebetween.

Figure 12:
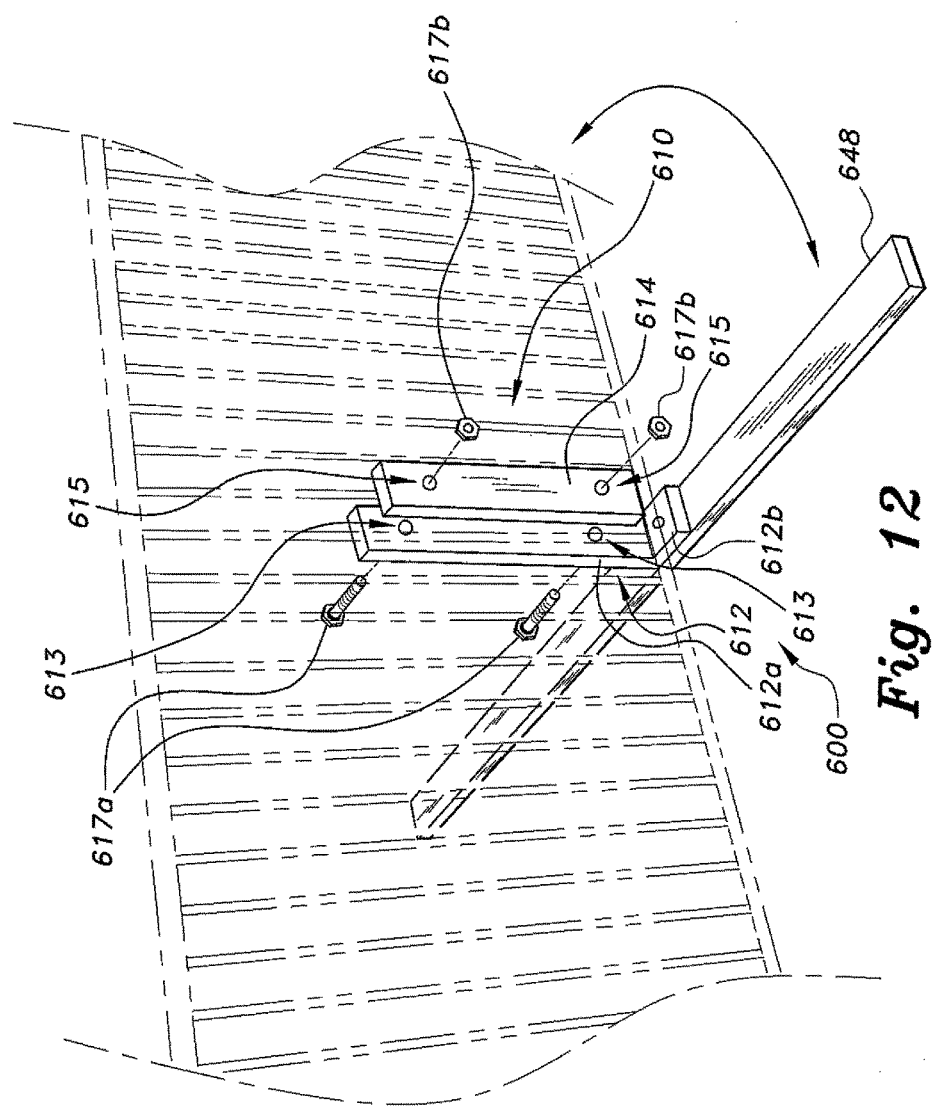
FIG. 12 is a perspective view of another embodiment of a fence panel support assembly for a poultry migration fence system according to the present invention, the fence panel support assembly configured for universal mounting capabilities.

Another embodiment of a fence panel support assembly 600 is shown in FIG. 12. This embodiment of the fence panel support assembly 600 is construed as a universal version because it is constructed so as to be capable of being mounted to a fence panel in various orientations. As shown, the fence panel support assembly 600 includes a mounting bracket 610 and an elongate support rail 648 pivotally coupled to the mounting bracket 610.

The mounting bracket 610 is desirably constructed as a two-piece member having a first clamp plate 612 and a second clamp plate 614. The first clamp plate 612 is desirably an L-shaped plate having an upright section 612a and a base section 612b extending orthogonally from one end of the upright section 612a. The support rail 648 is pivotally coupled to the base section 612b and pivotable between support and stowed positions. The base section 612b supports the fence panel, such as the typical wire fence panel 30, from either the minor section 34 or the major section 32. More specifically, unlike the previous embodiment of FIG. 11, the base section 612b supports the typical wire fence panel 30 from either the bottom cross member 35 or the top cross member 31. The first clamp plate 612 also includes at least a pair of through holes 613 for connecting corresponding clamping bolts 617a and nuts 617b. The second clamp plate 614 is desirably an elongate member with a corresponding pair of through holes 615 that when assembled, mounts to the fence panel with the through holes 615 aligned with the through holes 613 on the first clamp plate 612a to thereby sandwich and clamp the fence panel 30 therebetween. To ensure that the fence panel 30 is securely supported, the mounting bracket 610 is desirably mounted so that at least one of the vertical members 37 is clamped between the first clamp plate 612 and the second clamp plate 614. Consequently, the width of the first clamp plate 612 and the width of the second clamp plate 614 are dimensioned to accommodate one or more of the vertical members 37 of most standard sized wire fence panels.

The fence panel support assembly 600 can also be used with solid fence panels. For example, a solid fence panel, such as the solid fence panel 302 can be provided with a pair of mounting holes or openings formed thereon. The mounting bracket 600 can be mounted to the solid fence panel 302 with the first clamp plate 612 supporting the bottom and one side of the solid fence panel 302 while the second clamp plate 614 clamps the solid fence panel 302 to the first clamp plate 612 from the opposite side of the solid fence panel 302.

Figure 13:
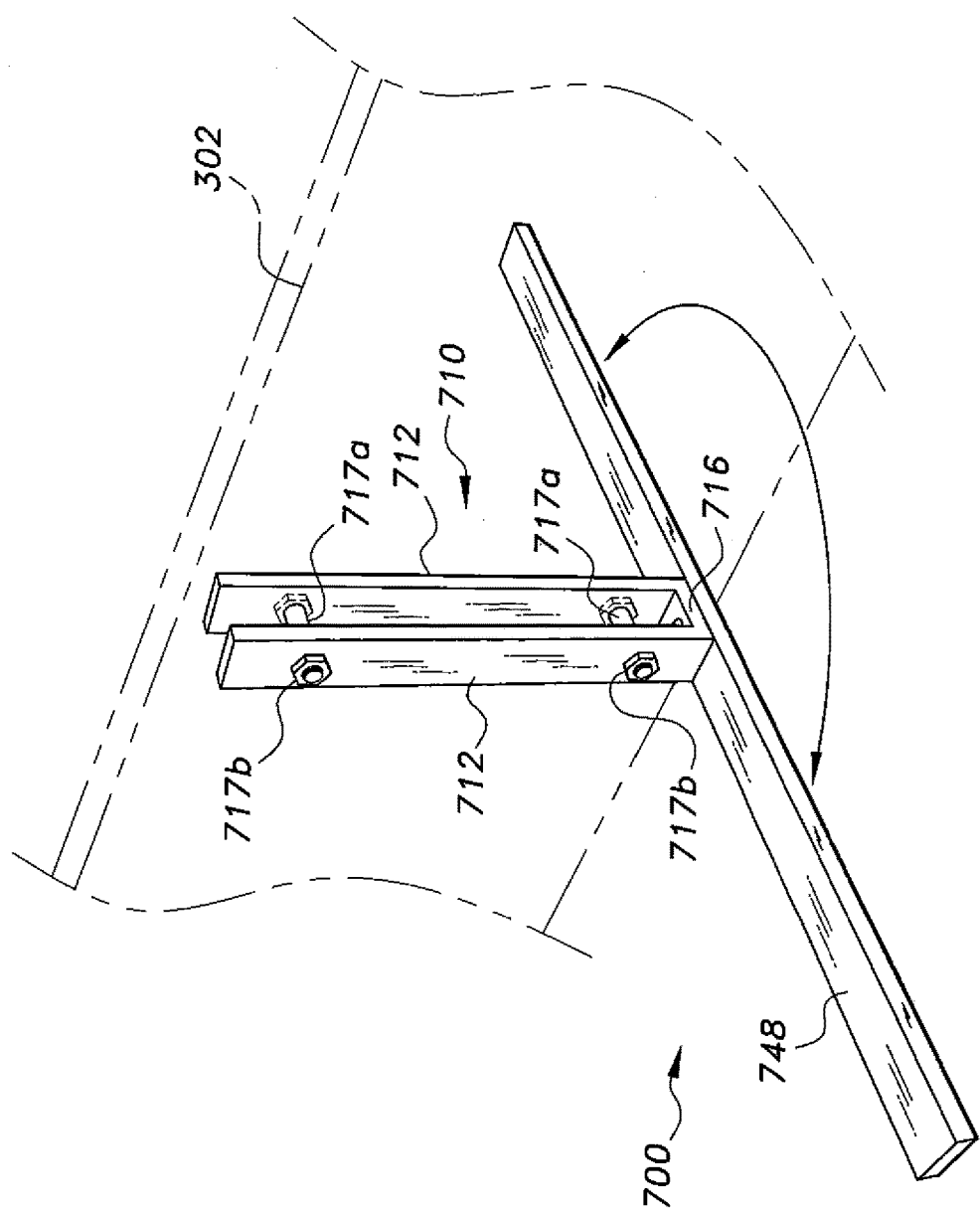
FIG. 13 is a perspective view of a further embodiment of a fence panel support assembly for a poultry migration fence system according to the present invention, the fence panel support assembly configured for installation onto solid fence panels.

In a similar vein, another embodiment of a fence panel support assembly 700 is shown in FIG. 13 specifically configured for the solid fence panel 302. This fence panel support assembly 700 includes a mounting bracket 710 and an elongate support rail 748 pivotally coupled to the mounting bracket 710.

The mounting bracket 710 is desirably constructed as a U-shaped member with a pair of spaced, elongate upright sections 712 interconnected by a base section 716. The upright sections 712 can also be referred to as first clamp plate and second clamp plate respectively. The support rail 748 is pivotably coupled to the base section 716 and pivotable between support and stowed positions. Each upright section 712 includes a pair of through holes for respective clamping bolts 717a and nuts 717b. Though the mounting bracket 710 is shown as a unitary member in the drawings, it is to be understood that the mounting bracket 710 can be provided as separate components coupled together by any conventional means, such as welds and fasteners.

In use, the solid fence panel 302 seats onto the mounting bracket 710 with the through holes thereon aligned with the through holes on the upright sections 712. The clamping bolts 717a are inserted through all the through holes, and the mounting bracket 710 is secured to the solid fence panel 302 with the clamping nuts 717b.

Figure 14A:
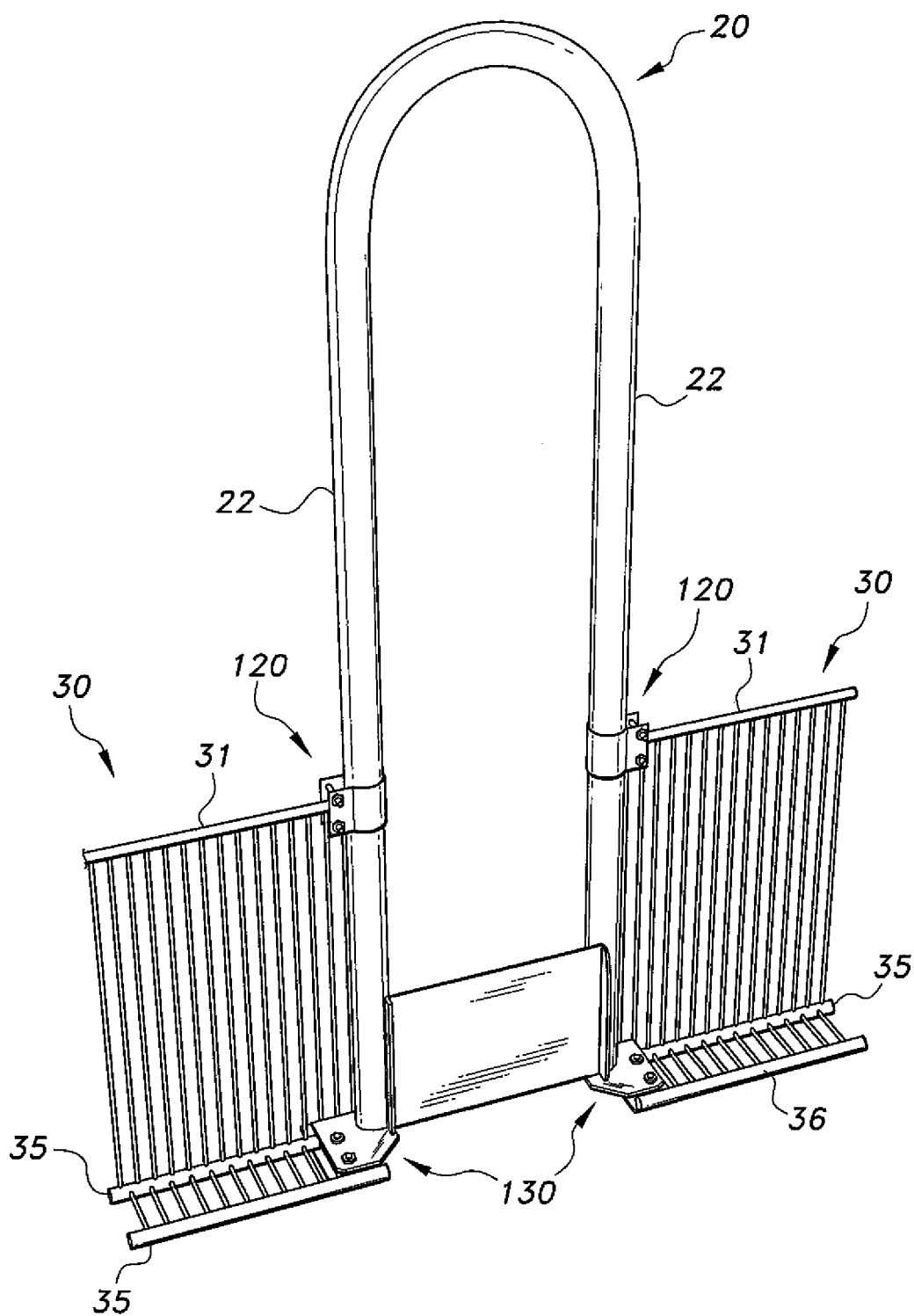
FIG. 14A is a perspective view of a mounting assembly for a poultry migration fence system according to the present invention.
Figure 14B:
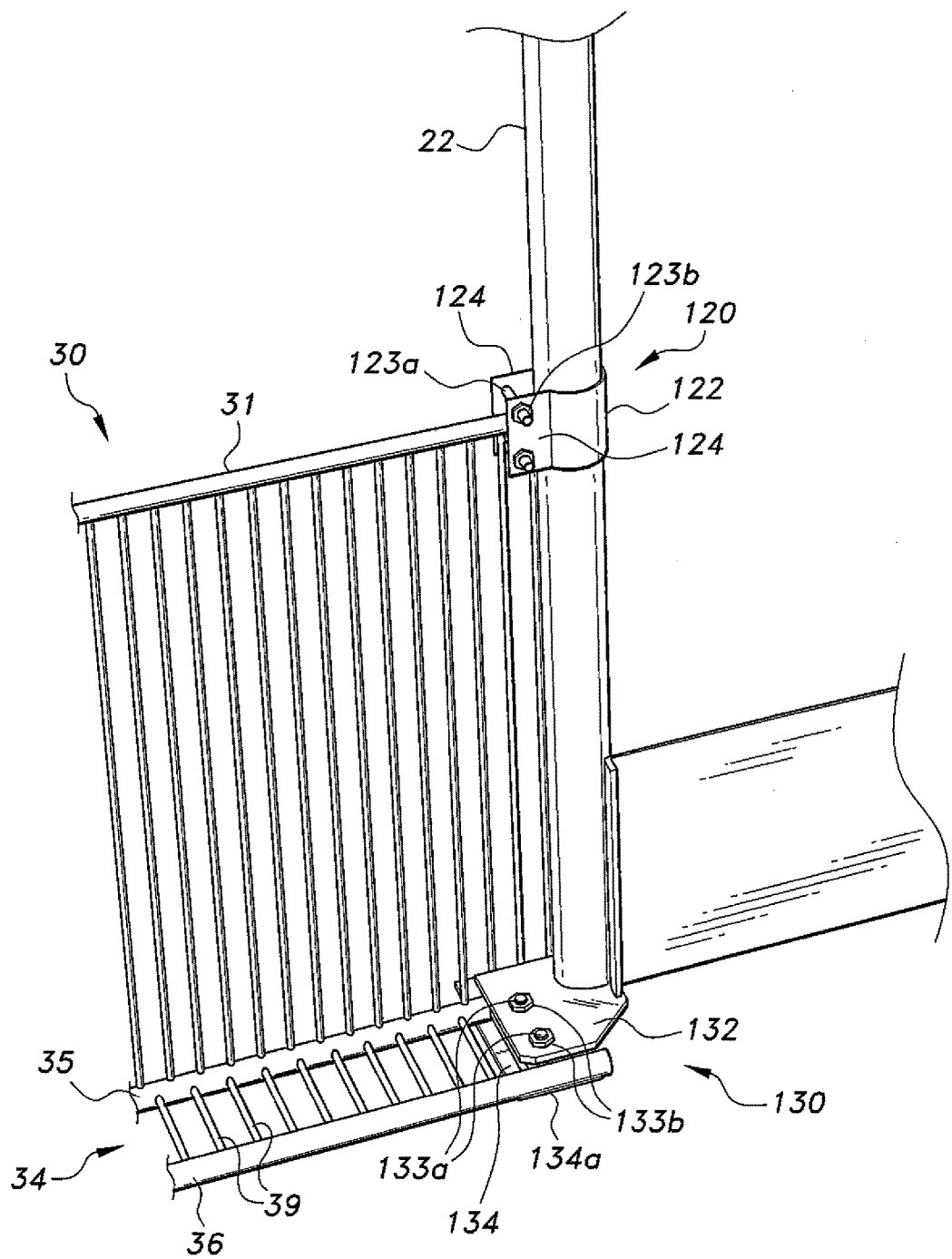
FIG. 14B is a detailed view of the mounting assembly for the migration fence system as shown in FIG. 14A.

Another embodiment of mounting means or mounting assembly between the U-shaped archways 20 and adjacent fence panels 30 is shown in FIGS. 14A and 14B. In this embodiment, the brackets for mounting the archways 20 to the fence panels provide enhanced adjustability and easier means of connecting the components together.

As best seen in FIGS. 14A and 14B, the attachments include a pair of upper archway mounting brackets 120 and a pair of lower archway mounting brackets 130. Each upper archway mounting bracket 120 is desirably configured as a substantially U-shaped member having an open curved section 122 and a leaf section 124 extending from each end of the open curved section 122. The curved section 122 is desirably shaped so as to conform to the contours of the leg 22 to ensure a secure mounted engagement thereon. Each leaf section 124 also includes a pair of spaced through holes for corresponding clamping hardware such as clamping bolts 123a and nuts 123b.

In use with the typical wire fence panels 30, the upper archway mounting bracket 120 can easily slide vertically along the length of the corresponding leg 22 to adjust for the height of the fence panel 30. The upper archway mounting bracket 120 is desirably positioned along the leg 22 so that the top cross member 31 is sandwiched between the leaf sections 124. When positioned thus, the clamping bolts 123a and nuts 123b clamps the upper archway mounting bracket 120 onto the top cross member 31 such that one set of clamping bolts 123a and nuts 123b lies above the top cross member 31 while the other set of clamping bolts 123a and nuts 123b lies below the top cross member 31. This arrangement insures that the upper archway mounting bracket 120 cannot be removed from the fence panel 30 without loosening the clamping bolts 123a or destroying the upper archway mounting bracket 120 by some conventional means; thus, the upper archway mounting bracket 120 provides a secure mounting without compromising the integrity thereof.

While the upper archway mounting bracket 120 secures the archway 20 to the top of the fence panel 30, the lower archway mounting bracket 130 secures the archway 20 to the minor section 34. In an embodiment, the lower archway mounting bracket 130 includes an upper clamping plate 132 and a lower clamping plate 134 configured to be coupled together by clamping bolts 133a and nuts 133b.

Each upper clamping plate 132 is desirably a relatively flat member integral with the respective leg 22 of the archway 20 and extends from the lower portion of the leg 22. At least one, preferably a pair, of through holes are formed on each upper clamping plate 132 for the clamping bolts 133a and clamping nuts 133b. Each lower clamping plate 134 is desirably an elongate, relatively flat member with a curved lip 134a at one end and corresponding through holes matching those on the upper clamping plate 132.

In use, the each upper clamping plate 132 lies on top of the minor section 34 over at least one lateral member 39. The lower clamping plate 134 lies beneath the same at least one lateral member 39 with the curved lip 134a cradling the outer cross member 36. The upper clamping plate 132 and the lower clamping plate 134 are then clamped together by the clamping bolts 133a and the clamping nuts 133b with the at least one lateral member 39 sandwiched between. The orientation of the lower clamping plate 134 can be reversed such that the curved lip 134a cradles the bottom cross member 35 instead. As long as the through holes in the lower clamping plate 134 is aligned with the through holes of the upper clamping plate 132, both clamping plates 132, 134 can be clamped together by the clamping bolts 133a and the clamping nuts 133b.

It is to be understood that the poultry migration fence system 10, 1000 encompasses a variety of alternatives. For example, the poultry migration fence system 10, 1000 can be constructed from various materials, such as steel, plastics, wood, composites and/or combinations thereof. The gate 52 can be constructed in any shape as long as it effectively blocks migration of poultry through the gap. Moreover, a variety of different gate constructions can be used so long as selective blocking of passage through the archways 20, 1020 can be maintained, e.g., swing gates and sliding gates. The support rail 48, 348, 3048 can be constructed in various shapes, such as tubular, hourglass, and the like. Moreover, the poultry migration fence system 10, 1000 can be provided in various colors and indicia. It is further noted that any number of bolts and fasteners can be used in the various connections described above while maintaining the functional properties of the connected components.

It is to be understood that the present invention is not limited to the embodiments described above, but encompasses any and all embodiments within the scope of the following claims.

I claim:

1. A fence panel support assembly for supporting at least one fence panel of a poultry migration fence system, comprising:
    at least one elongate support rail having an attachment point centrally disposed along the each one of the at least one elongate support rail;
    the attachment point defining a pivot axis normal to the elongate support rail; and
    a mounting bracket attached to each of the at least one elongate support rail at the attachment point thereon, for mounting the at least one elongate support rail onto the at least one fence panel, the mounting bracket comprising:
        a substantially U-shaped member, with opposing legs of the U-shaped member comprising at least one through hole, and
        at least one fastener coupled through the respective through holes of the opposing legs to clamp a minor portion of the at least one fence panel within the U-shaped member; and
    wherein the at least one elongate support rail and the mounting bracket are pivotable between a storage position in which the elongate support rail is parallel with the at least one fence panel and a support position in which the elongate support rail is perpendicular to the at least one fence panel, thereby supporting and bracing the at least one fence panel from inadvertent toppling.

2. The fence panel support assembly according to claim 1, wherein the
    substantially U-shaped member is adapted to slidably mount onto the minor section of the at least one fence panel in a horizontal orientation, the opposing legs of the U-shaped member comprising an upper plate section and a lower plate section interconnected by a closed end, the U-shaped member having an open end opposite from the closed end, the open end facilitating slidable mounting of the U-shaped member, the upper plate section and the lower plate section each having at least one through hole, the at least one elongate support rail being pivotally mounted to the lower plate section, the lower plate section having an upright lip at a distal end thereof.

3. The fence panel support assembly according to claim 1, wherein the at least one fastener comprises at least one clamping bolt and at least one clamping nut.

4. The fence panel support assembly according to claim 1, wherein the mounting bracket comprises:
    an elongate first clamp plate, the first clamp plate having at least one pair of through holes, the first clamp plate adapted to vertically support a section of the at least one fence panel, the at least one elongate support rail being pivotally mounted to the first clamp plate;
    an elongate second clamp plate selectively coupled to the first clamp plate to clamp the section of the at least one fence panel therebetween, the second clamp plate having at least one pair of through holes aligned with the at least one pair of through holes on the first clamp plate; and
    at least one pair of fasteners insertably mounted through the at least one pair of through holes on the first clamp plate and the second clamp plate to positively clamp the second clamp plate and the section of the at least one fence panel to the first clamp plate.

5. The fence panel support assembly according to claim 4, wherein the elongate first clamp plate comprises an elongate upright section and a base section extending orthogonally from one end of the upright section, the at least one elongate support rail being pivotally mounted to the base section.

6. The fence panel support assembly according to claim 4, wherein the at least one pair of fasteners comprises at least one pair of clamping bolts and at least one pair of clamping nuts.

7. The fence panel support assembly according to claim 1, wherein the substantially U-shaped member comprises a pair of spaced, elongate upright sections interconnected by a base section, the base section adapted to vertically support a section of the at least one fence panel, each upright section having at least one pair of through holes, the at least one elongate support rail being pivotally mounted to the base section; and at least one pair of fasteners insertably mounted through the through holes on the upright sections to positively clamp one upright section and the section of the at least one fence panel to the other upright section.

8. A support structure for supporting a fence panel of a poultry enclosure, comprising:

a support rail having a length and a pivotal attachment point centrally disposed on the support rail;

wherein the pivotal attachment point defines a pivot axis normal to the support rail;

a mounting bracket attached to the support rail at the pivotal attachment point;

the mounting bracket consisting of a substantially U-shaped member adapted to slidably mount onto a minor section of the fence panel in a horizontal orientation, the U-shaped member having an upper plate section and a lower plate section interconnected by a closed end, the U-shaped member having an opened end opposite from the closed end, the upper plate section and the lower plate section each having at least one through hole;

wherein the lower plate section of the mounting bracket has an upright lip at a distal end thereof, and is mounted to the support rail at the pivotal attachment point; and at least one fastener for coupling through the at least one through hole of the upper plate section and the lower plate section to clamp the U-shaped member onto the minor section;

thereby sandwiching the minor section between the upper plate section and the lower plate section;

wherein the at least one support rail and the mounting bracket are pivotable between a storage position in which the support rail is parallel with the fence panel and a support position in which the support rail is perpendicular to the fence panel, thereby supporting and bracing the fence panel from inadvertent toppling.

9. The support structure for supporting a fence panel of a poultry enclosure, according to claim 8, wherein the at least one fastener comprises at least one clamping bolt and at least one clamping nut.

10. A support structure for supporting a fence panel of a poultry enclosure, comprising:

a support rail having a length and a pivotal attachment point centrally disposed on the support rail;

wherein the pivotal attachment point defines a pivot axis normal to the support rail; and a mounting bracket including:

a pair of vertically disposed legs, each leg having a pair of through holes therein, at least one of the pair of vertically disposed legs having a member extending perpendicularly from one end thereof; and a fastener extending through the pair of through holes to clamp a minor portion of the at least one fence panel between the vertically disposed legs;

wherein the member of the mounting bracket is attached to the support rail at the pivotal attachment point;

wherein the at least one support rail and the mounting bracket are pivotable between a storage position in which the support rail is parallel with the fence panel and a support position in which the support rail is perpendicular to the fence panel, thereby supporting and bracing the fence panel from inadvertent toppling.

11. The support structure for supporting a fence panel of a poultry enclosure, according to claim 10, wherein the pair of vertical legs of the mounting bracket are defined by a first clamp plate and a second clamp plate, and the pair of through holes of the first clamp plate are aligned with the corresponding pair of through holes of the second plate; and at least one pair of fasteners are insertably mounted through the at least one pair of through holes on the first clamp plate and the second clamp plate to positively clamp the second clamp plate and the section of the at least one fence panel to the first clamp plate.

12. The support structure for supporting a fence panel of a poultry enclosure, according to claim 11, wherein the at least one pair of fasteners comprises at least one pair of clamping bolts and at least one pair of clamping nuts.

13. The support structure for supporting a fence panel of a poultry enclosure, according to claim 10, wherein the pair of vertical legs of the mounting bracket define an elongate substantially U-shaped member having a pair of spaced, elongate upright sections;

wherein the member extending from one of the legs is also connected to the other legs, thereby forming the U-shaped member interconnected by a base section;

wherein the support rail is pivotally mounted to the base section.

14. The support structure for supporting a fence panel of a poultry enclosure, according to claim 13, wherein at least one pair of fasteners are insertably mounted through the through holes on the upright sections to positively clamp one upright section and the section of the at least one fence panel to the other upright section.

15. The fence panel support assembly according to claim 14, wherein the at least one pair of fasteners comprises at least one pair of clamping bolts and at least one pair of clamping nuts.

* * * * *